US009810601B2

(12) United States Patent
Tighe

(10) Patent No.: US 9,810,601 B2
(45) Date of Patent: Nov. 7, 2017

(54) AIRCRAFT STRUCTURE

(75) Inventor: David Tighe, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/342,362

(22) PCT Filed: Aug. 7, 2012

(86) PCT No.: PCT/GB2012/051914
§ 371 (c)(1),
(2), (4) Date: Feb. 28, 2014

(87) PCT Pub. No.: WO2013/030527
PCT Pub. Date: Mar. 7, 2013

(65) Prior Publication Data
US 2014/0224043 A1 Aug. 14, 2014

(30) Foreign Application Priority Data

Sep. 1, 2011 (GB) .................................. 1115080.2

(51) Int. Cl.
*G01M 5/00* (2006.01)
*B29C 73/10* (2006.01)
(Continued)

(52) U.S. Cl.
CPC ........... *G01M 5/0016* (2013.01); *B29C 73/10* (2013.01); *B64C 1/064* (2013.01); *B64C 3/00* (2013.01);
(Continued)

(58) Field of Classification Search
CPC .. B64C 1/06; B64C 1/064; B64C 3/00; B64C 3/18; B64C 3/20; G01M 5/0016
See application file for complete search history.

(56) References Cited

U.S. PATENT DOCUMENTS 4,576,849 A 3/1986 Gardiner
6,638,466 B1 * 10/2003 Abbott .................... B29C 33/68
264/238
(Continued)

FOREIGN PATENT DOCUMENTS

DE 3739753 A1 6/1989
FR 2718074 A1 10/1995
(Continued)

OTHER PUBLICATIONS

UKIPO Search Report for Application No. GB1115080.2, dated Dec. 13, 2011.
(Continued)

*Primary Examiner* — Christopher P Ellis
*Assistant Examiner* — Jessica Wong
(74) *Attorney, Agent, or Firm* — Hauptman Ham, LLP

(57) ABSTRACT

The present invention provides an aircraft structure comprising a structural component and a set of reinforcing straps for reinforcing the structural component, wherein the set comprises a first reinforcing strap having an inner and outer surface, wherein the inner surface is attached to a first surface of the structural component such that the first reinforcing strap extends longitudinally along the structural component and a second reinforcing strap having an inner and outer surface, wherein the inner surface is attached to the outer surface of the first reinforcing strap such that the second reinforcing strap extends longitudinally along the first reinforcing strap. The invention also provides an aircraft, a method of reinforcing an aircraft structure and a method of inspecting an aircraft structure.

13 Claims, 2 Drawing Sheets

(51) Int. Cl.
  *B64C 1/06* (2006.01)
  *B64C 3/00* (2006.01)
  *B64C 3/18* (2006.01)
  *B64C 3/26* (2006.01)
  *B64F 5/00* (2017.01)
  *B64F 5/60* (2017.01)
(52) U.S. Cl.
  CPC .............. *B64C 3/182* (2013.01); *B64C 3/187* (2013.01); *B64C 3/26* (2013.01); *B64F 5/00* (2013.01); *B64F 5/60* (2017.01); *Y10T 29/49732* (2015.01); *Y10T 29/49826* (2015.01)

(56) References Cited

U.S. PATENT DOCUMENTS

2003/0042364 A1* 3/2003 Tanaka ..................... B64C 3/20
                                                      244/123.2
2006/0226287 A1  10/2006  Grantham et al.
2006/0249626 A1* 11/2006  Simpson ................... B64C 3/20
                                                      244/123.1
2008/0277531 A1  11/2008  Ackermann et al.
2010/0096067 A1   4/2010  Dunleavy
2010/0272954 A1* 10/2010  Roming .................. B64C 1/064
                                                      428/138

FOREIGN PATENT DOCUMENTS

| GB | 1468030 A | 3/1977 |
| JP | H03234615 A | 10/1991 |
| JP | 2002293295 A | 10/2002 |
| JP | 2003039566 A | 2/2003 |
| WO | 0158680 A1 | 8/2001 |

OTHER PUBLICATIONS

International Search Report and Written Opinion for PCT/GB2012/051914, dated Jan. 7, 2013.

* cited by examiner

AIRCRAFT STRUCTURE

RELATED APPLICATIONS

The present application is a National Phase of International Application Number PCT/GB2012/051914, filed Aug. 7, 2012, and claims priority from United Kingdom Application Number GB1115080.2, filed Sep. 1, 2011.

BACKGROUND OF THE INVENTION

The present invention concerns the field of aircraft structures. More particularly, but not exclusively, this invention concerns an aircraft structure comprising a structural component, and at least one reinforcing strap for reinforcing the structural component. The invention also concerns a method of reinforcing an aircraft structure, for example during repair of the structure or retrofit of an additional component to the structure. The invention also concerns a method of inspecting an aircraft structure.

It is sometimes desired to retrofit an additional component to an existing aircraft structure. For example, a wing tip device, such as a winglet, may be retrofitted to an existing aircraft wing. As part of the retrofit procedure, the aircraft structure needs to be reinforced. This is because the aircraft structure was not originally designed to include the additional component. In the wing tip device example, the wing box structure needs to be reinforced. It is also sometimes required to reinforce an existing aircraft structure as part of a repair procedure.

A typical wing box structure comprises an upper and a lower cover, comprising skin and spanwise extending stringers, and a front and a rear spar, extending spanwise along the wing box structure. The wing box structure also comprises ribs which extend chordwise across the wing box structure between the skins. The ribs are provided with mouseholes to allow the stringers to pass through. The lower cover allows access to the interior of the wing box structure via manholes, to allow inspection of the interior of the wing box structure. The stringers adjacent to the manholes are called manhole boundary stringers.

When a wing tip device is retrofitted to the outboard end of the wing, it is likely that the wing box structure requires reinforcement, including reinforcement of the manhole boundary stringers. However, due to the fact that the stringers must pass through the mouseholes, there is not much space for the reinforcement, which must be continuous. As a result, the stringers are often reinforced with a reinforcing strap made of high strength steel so that, for the same load, the strap is smaller than it would have been if it were made from aluminium alloy.

A side sectional view of part of a prior art aircraft outboard wing box structure, with a reinforced manhole boundary stringer, is shown in FIG. 1.

The wing box structure includes a lower cover structure 10 with a manhole boundary stringer 30 extending upwards from the cover structure 10 and extending in a spanwise longitudinal direction of the wing box structure. Extending in the chordwise direction of the wing box structure is a rib 20 with a mousehole 21 for allowing the stringer 30 to pass longitudinally through the rib 20. The stringer 30 comprises a web portion 31 which extends inwards from the cover structure 10 and an end portion which extends from the distal end of the web 31 portion in both chordwise directions to provide a chordwise extending flange 32. A reinforcing strap 40 is attached to one side of the web portion 31 of the stringer 30 and extends longitudinally along the stringer 30. The reinforcing strap 40 is made from high strength steel.

However, high strength steel has a low toughness compared to other materials. Hence, it has a lower resistance to crack propagation. This means that a small flaw in the material can develop into a crack in a shorter time frame than with other tougher materials. This can lead to a higher maintenance frequency to check for flaws and cracks in the reinforcing strap. Every maintenance operation causes downtime for the aircraft and costs money for the airline operating the aircraft.

In addition, it is important that a retrofit or repair procedure is as quick as possible to minimise downtime of the aircraft.

The present invention seeks to mitigate the above-mentioned problems. Alternatively or additionally, the present invention seeks to provide an improved aircraft structure that is less vulnerable to crack propagation, especially after reinforcement during a repair or retrofit procedure, for example.

SUMMARY OF THE INVENTION

The present invention provides, according to a first aspect, an aircraft structure comprising a structural component, and a set of reinforcing straps for reinforcing the structural component, wherein the set comprises a first reinforcing strap having an inner and outer surface, wherein the inner surface is attached to a first surface of the structural component such that the first reinforcing strap extends longitudinally along the structural component, and a second reinforcing strap having an inner and outer surface, wherein the inner surface is attached to the outer surface of the first reinforcing strap such that the second reinforcing strap extends longitudinally along the first reinforcing strap. Providing more than one reinforcing strap on the structural component provides a greater degree of redundancy in the aircraft structure. A crack in one reinforcing strap cannot propagate into a second reinforcing strap thereby minimising the loss of strength associated with a single crack. This provides a reduced maintenance burden on the operator.

The reinforcing straps are separately formed from each other and from the structural component. The first reinforcing strap is then attached to the structural component and the second reinforcing strap is attached to the first reinforcing strap.

The term "strap" is used to refer to a relatively thin, substantially flat, plate-like component for lying flush against a substantially flat surface.

Preferably, over at least a portion of the length of the reinforcing straps, the first reinforcing strap has a height (along the structural component) between a top and bottom of the first reinforcing strap that is larger than the height (along the structural component) of the second reinforcing strap between a top and bottom of the second reinforcing strap. This allows a portion of the first (inner) reinforcing strap to be seen during an inspection. In other words, the second (outer) strap does not cover up the first (inner) strap entirely. This allows for cracks and flaws to be noticed on the first (inner) strap.

Preferably, the height of the first reinforcing strap is approximately 115 to 125% of the height of the second reinforcing strap. More preferably, the height of the first reinforcing strap is approximately 120% of the height of the second reinforcing strap. This allows a significant portion of the first (inner) strap to be seen during inspection.

Preferably, over at least a portion of the length of the reinforcing straps, the second reinforcing strap has an average thickness (substantially perpendicular to the plane of the structural component) between the inner and outer surfaces of the second reinforcing strap that is larger than the average thickness (substantially perpendicular to the plane of the structural component) of the first reinforcing strap between the inner and outer surfaces of the first reinforcing strap. More preferably, the thickness of the first reinforcing strap varies along its height. Even more preferably, a top portion and/or a bottom portion of the first reinforcing strap is thinner than a middle portion of the first reinforcing strap.

Preferably, the thickness of the second reinforcing strap is constant along its height.

Preferably, the average thickness of the second reinforcing strap is approximately 115 to 125% of the average thickness of the first reinforcing strap. More preferably, the average thickness of the second reinforcing strap is approximately 120% of the average thickness of the first reinforcing strap.

Preferably, the at least a portion of the length of the reinforcing straps is the entire length of the reinforcing straps. This allows the first (inner) strap to be seen along its entire length during inspection.

Preferably, the height and average thickness of the reinforcing straps are such that the cross-sectional areas of the first and second reinforcing straps are substantially the same. This provides both straps with the same load capability and therefore, there is no under or over redundancy of the straps.

Preferably, the structural component has a second surface opposite its first surface and wherein a second set of reinforcing straps is attached to the second surface of the structural component in a similar way to the first set of reinforcing straps to the first surface of the structural component. This allows four reinforcing straps to be provided on the structural component. This gives a greater amount of redundancy in the aircraft structure.

Preferably, the structural component is a stringer.

Preferably, the aircraft structure further comprises a skin component to which the stringer is attached and wherein the first surface of the stringer is a surface extending inwardly from an inner surface of the skin component. This allows the reinforcing straps to be provided on a surface of the stringer without increasing the distance by which the stringer extends inwards from the skin. In other words, the reinforcing straps effectively increase the thickness of the inwardly extending surface, without increasing its length. In particular, it is noted that stringers often have an enlarged portion (with a greater thickness) at a distal end of the stringer. Hence, the reinforcing straps do not, in fact, increase the overall largest thickness of the stringer.

Preferably, the aircraft structure further comprises a rib extending across the stringer and wherein the rib is provided with a hole for the stringer to pass through and wherein the reinforcing straps also pass through the hole.

More preferably, the aircraft structure is a wing box and wherein a wing tip device is fitted to the wing box structure and wherein the reinforcing straps are located towards an outboard end of at least one stringer to provide reinforcement of the stringer.

According to the first aspect, the present invention also provides an aircraft comprising an aircraft structure as described above. Preferably, the aircraft is a commercial transport aircraft. The aircraft is preferably of a size equivalent to an aircraft designed to carry more than 75 passengers, and more preferably more than 100 passengers.

According to a second aspect of the invention there is also provided a method of reinforcing an aircraft structure, the method including the steps of attaching a first reinforcing strap to a structural component of the aircraft structure, wherein an inner surface of the first reinforcing strap is attached to a first surface of the structural component such that the first reinforcing strap extends longitudinally along the structural component, attaching a second reinforcing strap to the first reinforcing strap, wherein an inner surface of the second reinforcing strap is attached to an outer surface of the first reinforcing strap such that the second reinforcing strap extends longitudinally along the first reinforcing strap.

Preferably, over at least a portion of the length of the reinforcing straps, the first reinforcing strap has a height between a top and bottom of the first reinforcing strap that is larger than the height of the second reinforcing strap between a top and bottom of the second reinforcing strap.

Preferably, the method is carried out as part of a repair procedure of the aircraft structure or as part of a procedure to retrofit a further component to the aircraft structure. This allows a repair or retrofit procedure to be carried out, whilst minimising the vulnerability of the aircraft structure to crack propagation and/or minimising the required maintenance frequency.

More preferably, the method comprises the steps of fitting a wing tip device to a wing structure of an aircraft, and attaching the first and second reinforcing straps to a stringer of the wing structure to reinforce the wing structure.

Preferably, the method further comprises the steps of attaching a second set of reinforcing straps to a second, opposite surface of the structural component in a similar way to the first set of reinforcing straps to the first surface of the structural component.

According to a third aspect of the invention there is also provided a method of inspecting an aircraft structure, the aircraft structure comprising a structural component, and a set of at least two reinforcing straps, the first reinforcing strap extending longitudinally along the structural component and the second reinforcing strap extending longitudinally along the first reinforcing strap, the method comprising the steps of inspecting the second reinforcing strap, and inspecting a portion of the first reinforcing strap that is not covered by the second reinforcing strap. This allows a portion of the first (inner) strap to be seen during inspection without having to remove the second (outer) strap.

It will of course be appreciated that features described in relation to one aspect of the present invention may be incorporated into other aspects of the present invention. For example, the methods of reinforcing or inspection of the invention may incorporate any of the features described with reference to the aircraft structure of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
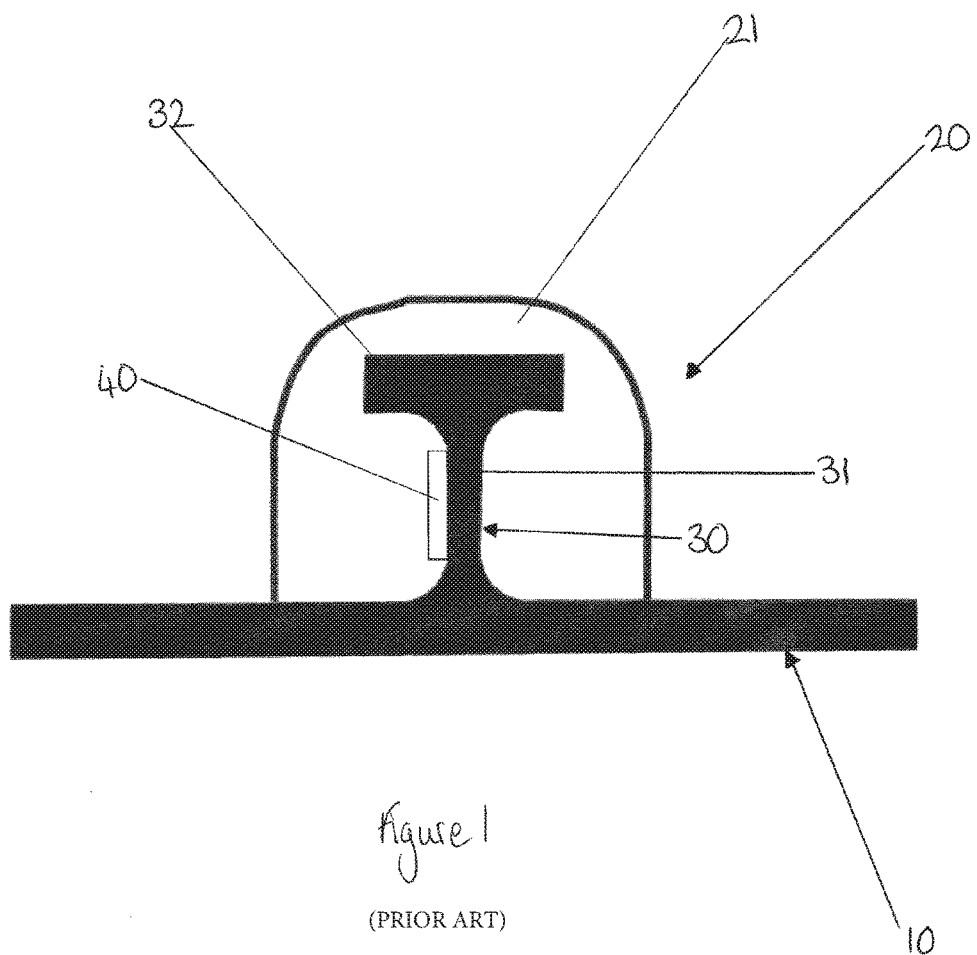
FIG. 1 shows a side sectional view of a prior art stringer with a reinforcing strap.
Figure 2:
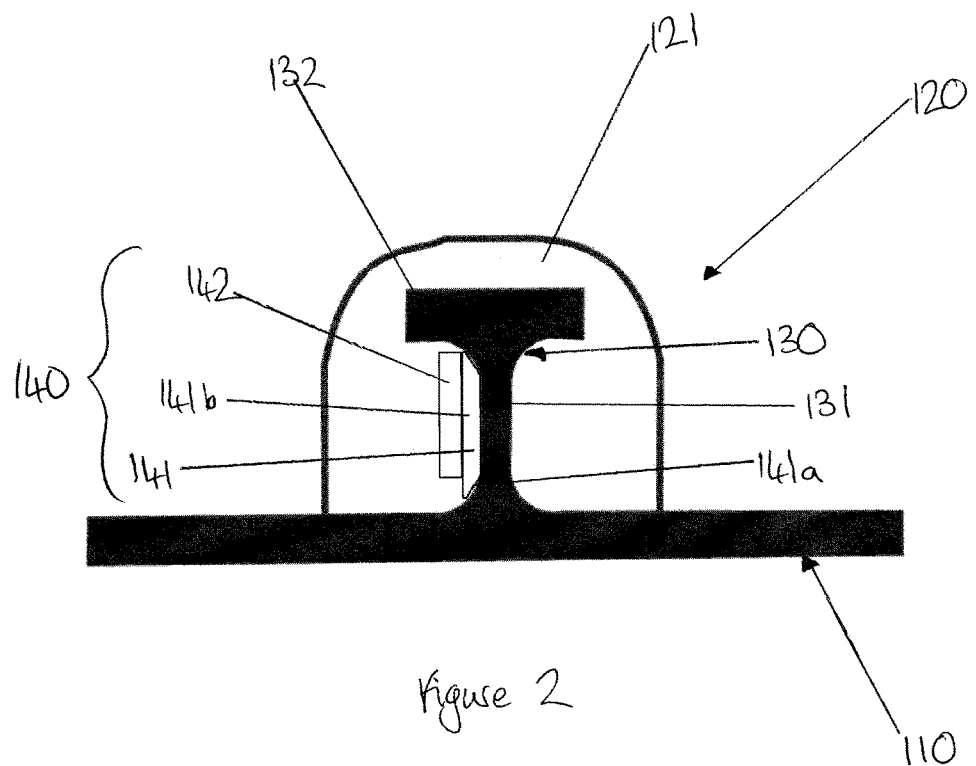
FIG. 2 shows a side sectional view of a stringer with two reinforcing straps, according to a first embodiment of the invention.

FIG. 2 shows a side sectional view of part of an aircraft outboard wing box structure, with a reinforced manhole boundary stringer, according to a first embodiment of the present invention.

The wing box structure includes a lower cover structure 110 with a manhole boundary stringer 130 extending upwards from the cover structure 110 and extending in a spanwise longitudinal direction of the wing box structure. Extending in the chordwise direction of the wing box structure is a rib 120 with a mousehole 121 for allowing the stringer 130 to pass longitudinally through the rib 120. The stringer 130 comprises a web portion 131 which extends upwards from the cover structure 110 and an end portion which extends from the web 131 in both chordwise directions to provide a chordwise flange 132.

A set of reinforcing straps 140 is attached to one side of the web portion 131 of the stringer 130. The set of reinforcing straps includes a first reinforcing strap 141 attached to one side of the web portion 131 and extending longitudinally along the stringer 130. The first reinforcing strap 141 has a middle portion 141b with a constant thickness. It has top and bottom portions 141a which taper on the inner surface of the first reinforcing strap to a point. This allows the first reinforcing strap 141 to fit against the side of the web portion 131, allowing for the rounded corners between the web portion 131 and the cover structure 110 and the web portion 131 and the chordwise flange 132. The outer surface of the first reinforcing strap 141 is substantially flat. A second reinforcing strap 142 is attached to the outer surface of the first reinforcing strap 141 and extends longitudinally along the first reinforcing strap 141. The second reinforcing strap 142 has a constant thickness. The top of the second reinforcing strap 142 is at the same height as the top of the first reinforcing strap 141. However, the bottom of the second reinforcing strap 142 is higher than the bottom of the first reinforcing strap 141. Hence, a lower portion of the first reinforcing strap 141 is left exposed by the second reinforcing strap 142.

Both reinforcing straps 141, 142 are made from high strength steel. In order to provide the same load carrying ability, the cross-sectional areas of the straps 141, 142 are the same. As the height of the first reinforcing strap is greater than the second reinforcing strap (by about 20%), the thickness of the second reinforcing strap 142 is greater (by about 20%) than the average thickness of the first reinforcing strap 141.

The straps 141, 142 are designed with a cross-sectional area to allow for one of the straps to have developed a flaw that has propagated to a crack and therefore the strap has a loss of strength, where the overall section has enough residual strength to carry sufficient load until the next inspection.

Figure 3:
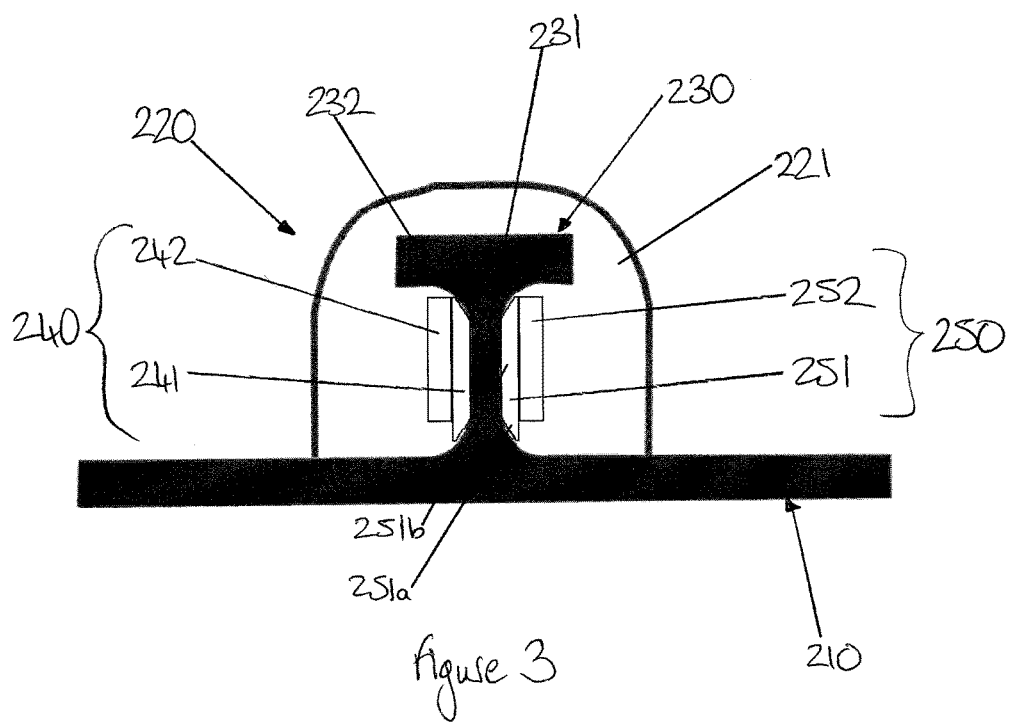
FIG. 3 shows a side sectional view of a stringer with four reinforcing straps, according to a second embodiment of the invention.

FIG. 3 shows a side sectional view of part of an aircraft outboard wing box structure, with a reinforced manhole boundary stringer, according to a second embodiment of the present invention.

The wing box structure includes a lower cover structure 210 with a manhole boundary stringer 230 extending upwards from the cover structure 210 and extending in a spanwise longitudinal direction of the wing box structure. Extending in the chordwise direction of the wing box structure is a rib 220 with a mousehole 221 for allowing the stringer 230 to pass longitudinally through the rib 220. The stringer 230 comprises a web portion 231 which extends upwards from the cover structure 210 and an end portion which extends from the web 231 in both chordwise directions to provide a chordwise flange 232.

A first set of reinforcing straps 240 is attached to one side of the web portion 231 of the stringer 230. The first set of reinforcing straps includes a first reinforcing strap 241 attached to one side of the web portion 231 and extending longitudinally along the stringer 230. The first reinforcing strap 241 has a middle portion 241b with a constant thickness. It has top and bottom portions 241a which taper on the inner surface of the first reinforcing strap to a point. This allows the first reinforcing strap 241 to fit against the side of the web portion 231, allowing for the rounded corners between the web portion 231 and the cover structure 210 and the web portion 231 and the chordwise flange 232. The outer surface of the first reinforcing strap 241 is substantially flat. A second reinforcing strap 242 is attached to the outer surface of the first reinforcing strap 241 and extends longitudinally along the first reinforcing strap 241. The second reinforcing strap 242 has a constant thickness. The top of the second reinforcing strap 242 is at the same height as the top of the first reinforcing strap 241. However, the bottom of the second reinforcing strap 242 is higher than the bottom of the first reinforcing strap 241. Hence, a lower portion of the first reinforcing strap 241 is left exposed by the second reinforcing strap 242.

Both reinforcing straps 241, 242 are made from high strength steel. In order to provide the same load carrying ability, the cross-sectional areas of the straps 241, 242 are the same. As the height of the first reinforcing strap is greater than the second reinforcing strap (by about 20%), the thickness of the second reinforcing strap 242 is greater (by about 20%) than the average thickness of the first reinforcing strap 241.

A second set of reinforcing straps 250 is also provided on the other, opposite side of the web portion 232 of the stringer 230. The second set of reinforcing straps 250 is similar to the first set of reinforcing straps 240. In the same way, a lower portion of the first reinforcing strap 251 of the second set is left exposed by the second reinforcing strap 252 of the second set.

The second reinforcing strap 251 has a middle portion 251b with a constant thickness. It has top and bottom portions 251a which taper on the inner surface of the first reinforcing strap to a point. The straps 241, 242, 251, 252 are designed with a cross-sectional area to allow for one of the straps to have developed a flaw that has propagated to a crack and therefore the strap has a loss of strength, where the overall section has enough residual strength to carry sufficient load until the next inspection.

During a repair or retrofit procedure, the stringers of the wing box structure can be reinforced by attaching first and second reinforcing straps 141, 142, 241, 241, 251, 252 to the stringers 130, 230.

During inspection, the lower portion of all first reinforcing straps 141, 241, 252 can be seen and inspected through a manhole in the covers 110, 210 without removing the second reinforcing straps 142, 242, 252. This means that cracks and flaws can be detected in the first reinforcing straps 141, 241, 252, as well as the second reinforcing straps 142, 242, 252, without deconstruction.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The reinforcing straps, or at least one of the reinforcing straps, may be made from a different material, other than high strength steel. For example, a different metallic alloy may be used or a composite material may be used.

The reinforcing straps may be attached to a different structural component, such as a rib, a spar, a skin, or a stringer that is not a manhole boundary stringer. The reinforcing straps may also be used in a location in an aircraft other than a wing, such as the tailplane or fuselage.

The reinforcing straps may be attached to the structural component using any convenient attachment mechanism. For example, rivets, bolts or adhesive may be used. The second reinforcing strap may be attached to the first reinforcing strap prior to the first reinforcing strap being attached to the structural component. The first and second reinforcing straps may be attached to the structural component using rivets or bolts passing through both straps.

In relation to the second embodiment of the invention, all four reinforcing straps may be attached using rivets or bolts passing through all four straps.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft structure comprising:
   an aircraft structural component having a first outer surface, and
   a set of reinforcing straps for reinforcing the aircraft structural component, wherein the set comprises:
   a first reinforcing strap having an inner and outer surface, wherein the inner surface is attached to the outer surface of the aircraft structural component such that the first reinforcing strap extends longitudinally along the aircraft structural component,
   a second reinforcing strap having an inner and outer surface, wherein the inner surface is attached to the outer surface of the first reinforcing strap and the inner surface does not contact the outer surface of the aircraft structural component such that the second reinforcing strap extends longitudinally along the first reinforcing strap,
   wherein over at least a portion of the length of the reinforcing straps, the second reinforcing strap has an average thickness between the inner and outer surfaces of the second reinforcing strap that is larger than the average thickness of the first reinforcing strap between the inner and outer surfaces of the first reinforcing strap,
   wherein the thickness of the first reinforcing strap varies along its height,
   wherein the aircraft structural component is a stringer, and
   wherein the aircraft structure further comprises a rib extending across the stringer and wherein the rib is provided with a hole for the stringer to pass through and wherein the reinforcing straps also pass through the hole.

2. An aircraft structure as claimed in claim 1, wherein, over at least a portion of the length of the reinforcing straps, the first reinforcing strap has a height between a top and bottom of the first reinforcing strap that is larger than the height of the second reinforcing strap between a top and bottom of the second reinforcing strap.

3. An aircraft structure as claimed in claim 2, wherein the height of the first reinforcing strap is approximately 115 to 125% of the height of the second reinforcing strap.

4. An aircraft structure, as claimed in claim 1, wherein a top portion or a bottom portion of the first reinforcing strap is thinner than a middle portion of the first reinforcing strap.

5. An aircraft structure, as claimed in claim 1, wherein the thickness of the second reinforcing strap is constant along its height.

6. An aircraft structure as claimed in claim 1, wherein the average thickness of the second reinforcing strap is approximately 115 to 125% of the average thickness of the first reinforcing strap.

7. An aircraft structure as claimed in claim 2, wherein the at least a portion of the length of the reinforcing straps is the entire length of the reinforcing straps.

8. An aircraft structure as claimed in claim 1, wherein the height and average thickness of the reinforcing straps are such that the cross-sectional areas of the first and second reinforcing straps are substantially the same.

9. An aircraft structure as claimed in claim 1, wherein the aircraft structural component has a second surface opposite its first surface and wherein a second set of reinforcing straps is attached to the second surface of the aircraft structural component in a similar way to the first set of reinforcing straps to the first surface of the aircraft structural component.

10. An aircraft structure as claimed in claim 1, wherein the aircraft structure further comprises a skin component to which the stringer is attached and wherein the first surface of the stringer is a surface extending inwardly from an inner surface of the skin component.

11. An aircraft structure as claimed in claim 1, wherein the aircraft structure is a wing box structure and wherein a wing tip device is fitted to the wing box structure and wherein the reinforcing straps are located towards an outboard end of the stringer to provide reinforcement of the stringer.

12. An aircraft comprising an aircraft structure as claimed in claim 1.

13. An aircraft structure comprising:
   an aircraft structural component having an outer surface, and
   a set of relatively thin and substantially flat reinforcing straps for reinforcing the aircraft structural component, wherein the set comprises:
   a first reinforcing strap having an inner and outer surface, wherein the inner surface is attached to the outer surface of the aircraft structural component such that the first reinforcing strap extends longitudinally along the aircraft structural component,
   a second reinforcing strap having an inner and outer surface, wherein the inner surface is attached to the outer surface of the first reinforcing strap and the inner surface does not contact the outer surface of the aircraft structural component such that the second reinforcing strap extends longitudinally along the first reinforcing strap,
   wherein over at least a portion of the length of the reinforcing straps, the second reinforcing strap has an average thickness between the inner and outer surfaces of the second reinforcing strap that is larger than the average thickness of the first reinforcing strap between the inner and outer surfaces of the first reinforcing strap, wherein the thickness of the first reinforcing strap varies along its height, wherein, over at least a portion of the length of the reinforcing straps, the first reinforcing strap has a height between a top and bottom of the first reinforcing strap that is larger than the height of the second reinforcing strap between a top and bottom of the second reinforcing strap, wherein the aircraft structural component is a stringer, and wherein the aircraft structure further comprises a rib extending across the stringer and wherein the rib is provided with a hole for the stringer to pass through and wherein the reinforcing straps also pass through the hole.

* * * * *